US009649765B2

(12) United States Patent
Frische et al.

(10) Patent No.: US 9,649,765 B2
(45) Date of Patent: May 16, 2017

(54) REDUCING ENERGY CONSUMPTION OF INDUSTRIAL ROBOTS BY USING NEW METHODS FOR MOTION PATH PROGRAMMING

(71) Applicants: Siemens Product Lifecycle Management Software Inc., Plano, TX (US); Siemens Aktiengesellschaft, Munich (DE)

(72) Inventors: Matthias Frische, Ahlden (DE); Frank Jungnickel, Langensendelbach (DE)

(73) Assignees: Siemens Aktiengesellschaft, Munich (DE); Siemens Product Lifecycle Management Software Inc., Plano, TX (US)

( * ) Notice: Subject to any disclaimer, the term of this patent is extended or adjusted under 35 U.S.C. 154(b) by 0 days.

(21) Appl. No.: 14/197,620

(22) Filed: Mar. 5, 2014

(65) Prior Publication Data
US 2014/0257558 A1     Sep. 11, 2014

Related U.S. Application Data

(60) Provisional application No. 61/776,386, filed on Mar. 11, 2013.

(51) Int. Cl.
*G06F 19/00*     (2011.01)
*B25J 9/16*      (2006.01)

(52) U.S. Cl.
CPC ... *B25J 9/1664* (2013.01); *G05B 2219/39361* (2013.01); *G05B 2219/40476* (2013.01); *G05B 2219/40515* (2013.01)

(58) Field of Classification Search
CPC ......... B25J 9/1664; G05B 2219/39361; G05B 2219/40476; G05B 2219/40515;
(Continued)

(56) References Cited

U.S. PATENT DOCUMENTS 5,784,542 A    7/1998   Ohm et al.
6,004,016 A    12/1999  Spector
(Continued)

FOREIGN PATENT DOCUMENTS

DE   102008027475 A1   12/2009
DE   10 2010 052253 A1  5/2012
(Continued)

OTHER PUBLICATIONS

Hirakawa, A.R. ; Kawamura, A. Industry Applications Conference, 1996. Thirty-First IAS Annual Meeting, IAS '96., Conference Record of the 1996 IEEE vol. 3 DOI: 10.1109/IAS.1996.559286 Publication Year: 1996 , pp. 1626-1632 vol. 3.*

(Continued)

*Primary Examiner* — Khoi Tran
*Assistant Examiner* — Jorge Peche

(57) ABSTRACT

Various disclosed embodiments include methods, systems, and computer-readable media for identifying a motion path for an industrial robot. According to one embodiment, a method includes identifying a plurality of points at which at least one component of the industrial robot is positioned during performance of a task. The identified points include at least a starting point and an ending point of the component for performing the task. The method also includes generating one or more motion paths for the industrial robot to perform the task based on the identified points. The method further includes identifying and predicting energy consumption by the industrial robot for the one or more generated motion paths. The method also includes selecting the motion path for the industrial robot based on the identified energy consumption. Additionally, the method includes storing information about the energy consumption by the industrial robot for the selected motion path.

18 Claims, 4 Drawing Sheets

(58) Field of Classification Search
CPC ..... B60W 2050/0005; B60W 2520/10; B60W 40/105; B60W 40/107; B60W 50/0097; G01C 21/3469
USPC .................. 700/245, 253, 255, 260
See application file for complete search history.

(56) References Cited

U.S. PATENT DOCUMENTS

| | | | |
|---|---|---|---|
| 6,216,058 | B1 | 4/2001 | Hosek et al. |
| 6,493,607 | B1 | 12/2002 | Bourne et al. |
| 6,728,599 | B2 | 4/2004 | Wang et al. |
| 7,298,385 | B2 | 11/2007 | Kazi et al. |
| 7,386,365 | B2 | 6/2008 | Nixon |
| 8,401,698 | B2 | 3/2013 | Kamrani et al. |
| 8,447,455 | B2 * | 5/2013 | Matsunaga ............ B25J 9/1664 700/245 |
| 8,620,473 | B2 | 12/2013 | Diolaiti et al. |
| 9,057,621 | B2 * | 6/2015 | Tate, Jr. ............. G01C 21/3469 |
| 2004/0111183 | A1 | 6/2004 | Sutherland et al. |
| 2005/0055132 | A1 | 3/2005 | Matsumoto et al. |
| 2005/0137648 | A1 | 6/2005 | Cosendai et al. |
| 2005/0197680 | A1 | 9/2005 | DelMain et al. |
| 2006/0025890 | A1 | 2/2006 | Nagatsuka et al. |
| 2006/0145647 | A1 | 7/2006 | Kitatsuji et al. |
| 2006/0217841 | A1 | 9/2006 | Matsumoto et al. |
| 2006/0287769 | A1 | 12/2006 | Yanagita et al. |
| 2008/0009971 | A1 * | 1/2008 | Kim .................. B62D 57/032 700/245 |
| 2008/0306628 | A1 | 12/2008 | Ng-Thow-Hing et al. |
| 2009/0105880 | A1 * | 4/2009 | Okazaki ............... B25J 9/1633 700/258 |
| 2010/0174436 | A1 * | 7/2010 | Matsunaga ............ B25J 9/1664 701/26 |
| 2010/0224022 | A1 | 9/2010 | Choi et al. |
| 2010/0305751 | A1 * | 12/2010 | Nagatsuka ............. B25J 9/1671 700/245 |
| 2011/0153080 | A1 | 6/2011 | Shapiro et al. |
| 2012/0158174 | A1 * | 6/2012 | Moon .................... G06N 3/008 700/245 |
| 2012/0165982 | A1 * | 6/2012 | Kim ....................... B25J 9/162 700/255 |
| 2012/0290131 | A1 | 11/2012 | Khoukhi |
| 2013/0030569 | A1 * | 1/2013 | Fudaba ................ G05B 19/423 700/245 |
| 2013/0116822 | A1 | 5/2013 | Atohira |
| 2014/0005804 | A1 | 1/2014 | Brand |
| 2014/0156068 | A1 | 6/2014 | Graca et al. |
| 2014/0163736 | A1 | 6/2014 | Azizian et al. |
| 2014/0207837 | A1 | 7/2014 | Taniguchi et al. |
| 2014/0257558 | A1 | 9/2014 | Frische et al. |
| 2015/0148952 | A1 | 5/2015 | Shiratsuchi |
| 2015/0177194 | A1 | 6/2015 | Xu et al. |
| 2015/0278404 | A1 | 10/2015 | Embon et al. |
| 2015/0278406 | A1 | 10/2015 | Embon et al. |

FOREIGN PATENT DOCUMENTS

| | | |
|---|---|---|
| EP | 1090723 A2 | 4/2001 |
| EP | 2 157 490 A1 | 2/2010 |
| EP | 2485875 B1 | 4/2013 |
| JP | 2004243461 A | 9/2004 |
| JP | 2006192554 A | 7/2006 |
| WO | 2005049284 A1 | 6/2005 |
| WO | 2005124486 A2 | 12/2005 |
| WO | 2011/042293 A1 | 4/2011 |
| WO | 2014052286 A1 | 4/2014 |

OTHER PUBLICATIONS

Hirakawa, A. R. et al.: "Trajectory Generation for Redundant Manipulators Under Optimization of Consumed Electrical Energy", Conference Record of the 1996 IEEE Industry Applications Conference—31st IAS Annual Meeting, IEEE Service Center, US, vol. 6, Oct. 6, 1996, XP010201236. (8 pages).

PCT Search Report dated Sep. 3, 2014, for PCT application No. PCT/US2014/021801. (13 pages).

Gasparetto et al., "Trajectory Planning in Robotics" Mathematics in Computer Science, vol. 6, No. 3, Aug. 30, 2012. pp. 269-279, XP035125437, 11 pages.

Ahuactzin, J., et al., "Using Genetic Algorithms for Robot Motion Planning," Proceedings of the 10th European Conference on Artifical Intelligence, 1992, 5 pages.

Bernhardt, R., et al., "Development of Virtual Robot Controllers and Future Trends," 6th IFAC Symposium on Cost Oriented Automation, Berlin, Germany, Oct. 8-9, 2001, 7 pages.

Bernhardt, R., "Von Realistischer Roboter Simulation Zu Virtuellen Steuerungen," ZWF, Zeitschrift fur Wirtschaftlichen Fabrikbetrieb, 2000, Munich, 5 pages. ( No translation).

Bernhart, R., et al., "Realistic Robot Simulation in Concurrent Engineering of Manufacturing Lines in Automative Industries," Eight ISPE International Conference on Concurrent Engineering : Research and Applications, Jul. 29-Aug. 1, 2002, 5 pages.

Bernhardt, R., et al., "The Virtual Robot Controller (VRC) Interface," ISATA 2000, Automation and Transportation Technology Simulation and Virtual Reality, Dublin Ireland, Sep. 25-27, 2000, 6 pages.

Bernhardt, R., et al., "Virtual Robot Controller (VRC) Interface," Robotik, 2000, 7 pages. ( No Translation).

Bernhart, R., et al., "Virtual Robot Controller as Simulation Agents," 2nd Workshop on Agent Based Simulation, ISBN 1-56555-215-6, Passau, Germany, Apr. 2-4, 2001, 6 pages.

Bohlin, R., et al., "Path Planning Using Lazy PRM," Proceedings of the 2000 IEEE International Conference on Robotics and Automation, San Francisco, CA, USA, Apr. 2000, pp. 521-528.

Chen, P., et al. "SANDROS: A Motion Planner with Performance Proportional to Task Difficulty," Proceedings of the 1992 IEEE International Conference on Robotics and Automation, Nice, France, May 1992, 8 Pages.

Faverjon, B., et al., "The Mixed Approach for Motion Planning: Learning Global Strategies from a Local Planner," Proceedings of the International Joint Conference on Artifical Intelligence, Jan. 1, 1987, 7 pages.

Gueta, L., et al., "Compact Design of Work Cell with Robot Arm and Positioning Table Under a Task Completion Time Constraint," 2009 IEEE/RSJ International Conference on Intelligent Robots and Systems, St. Louis, MS, USA, Oct. 11-15, 2009, 7 pages.

Gueta, L., et al., "Practical Point-to-Point Multiple-Goal Task Realization in a Robot Arm with a Rotating Table," Advanced Robotics, vol. 25, No. 6-7, 2011, pp. 717-738.

Hein, B., et al., "Automated Generated Collision-Free Time Optimized Robot Movements in Industrial Environments Based on Rounding," Proceedings of the 4th IEEE International Symposium on Assembly and Task Planning, Furuoka, Japan, May 28-29, 2001, pp. 110-115.

Hwang, Y,. et al., "Optimizing Robot Placement for Visit-Point Tasks" Proceedings of the AI and Manufacturing Research Planning Workshop, Albuquerque, NM, USA, Jun. 1996, 7 pages.

"Realistic Robot Simulation (RRS)," www.realistic-robot-simulation.org, Fraunhofer IPK, 2009, Retrieved Jul. 26, 2014, 4 pages.

Sanchez, G., et al, "Locally-Optimal Path Planning by Using Probabilistic Roadmaps and Simulated Annealing," Proceedings of IASTED International Conference on Robotics and Applications, Oct. 1999, 6 pages.

Skiena, S., "Weighted Graph Algorithms," The Algorithm Design Manual, 2nd Ed., Chapter 6, London, England, Aug. 2008, 39 pages.

Tian, L., et al., "An Effective Robot Trajectory Planning Method Using a Genetic Algorithm," Mechatronics, vol. 14, 2004, pp. 455-470.

Willnow, C., et al., "Virtual Time Management of Virtual Robot Controllers," Modeling and Simulation 2001, 15th European Simulation Multiconference 2001, ESM' 2001, Jun. 6-9, 2001, Prague, Czech Republic, 8 pages.

(56) References Cited

OTHER PUBLICATIONS

Yue, S., et al., "Point-to-Point Trajectory Planning of Flexible Redundant Robot Manipulators Using Genetic Algorithms," to appeal in Robotica, Trajectory Planning of FRM, Jul. 17, 2001, pp. 1-24.

Foreign Communication From a Related Counterpart Application, PCT Application No. PCT/US2013/061340, International Search Report dated Jan. 31, 2014, 16 pages.

U.S. Appl. No. 14/448,416, Non-Final Office Action dated Aug. 25, 2015, 9 pages.

Vergnano, Alberto et al. "Modeling and Optimization of Energy Consumption in Cooperative Multi-Robot Systems" IEEE Transactions on Automation Science and Engineering, vol. 9. No. 2, Apr. 2012, 6 pages.

Diaz, Nancy et al. "Cost and Energy Consumption Optimization of Product Manufacture in a Flexible Manufacturing System" Laboratory for Manufacturing and Sustainability, University of California at Berkeley, USA, 8 pages.

Cao, Bailin et al. "Practical Implementation of Time-efficient Trajectory Planning for Two Cooperative Industrial Robot Arms", Proceedings of the 1996 IEEE/RSJ International Conference on Robots and Systems (IROS). Robotic Intelligence Interacting with Synamic Worlds, Osaka, Nov. 4-8, 1996, XP000771580, ISBN: 978-0-7803-3214-0, 8 pages.

Wang, Fei-Yue et al. "Planning Time-Optimal Trajectory for Coordinated Robot Arms", Proceedings of the International Conference on Robotics and Automation Atlanta, May 2-6, 1993, Los Alamitos, IEEE Comp. Soc. Press, US, vol. Conf. 10, May 2, 1993, XP010095120, ISBN; 978-0-8186-3450-5, 6 pages.

Baba N. et al: "Collision avoidance planning of a robot manipulator by using genetic algorithm—A consideration for the problem in which moving obstacles and/or several robots are included in the workspace"; Evolutionary Computation, 1994; IEEE World Congress on Computational Intelligence; First IEEE Conference Orlando, Fl. USA Jun. 27-29, 1994; XP010122796; ISBN: 978-0-7803-1899-1, 6 pages.

* cited by examiner

REDUCING ENERGY CONSUMPTION OF INDUSTRIAL ROBOTS BY USING NEW METHODS FOR MOTION PATH PROGRAMMING

CROSS-REFERENCE TO RELATED APPLICATION(S) AND CLAIM OF PRIORITY

The present application claims priority to U.S. Provisional Patent Application Ser. No. 61/776,386, filed Mar. 11, 2013, entitled "Reducing Energy Consumption of Industrial Robots by Using New Methods for Motion Path Programming." The content of the above-identified patent document is incorporated herein by reference

TECHNICAL FIELD

The present disclosure is directed, in general, to computer-aided design, visualization, simulation, and manufacturing ("CAD") systems, product data management ("PDM") systems, product lifecycle management ("PLM") systems, offline programming software for robot ("OLP") systems, and similar systems that manage data for products and other items (individually and collectively, product lifecycle management systems ("PLM") systems).

BACKGROUND OF THE DISCLOSURE

PLM systems can provide users with helpful and intuitive views of systems, objects, topologies, and other items.

An industrial robot is a numerically controlled, multipurpose manipulator programmable in three or more axes. Typical applications of industrial robots include welding, painting, assembly, pick and place (such as packaging, palletizing, and surface mount technology), product inspection, and testing. Industrial robots are capable of accomplishing these tasks with high endurance, speed, and precision.

There is a need for improved control of industrial robots.

SUMMARY OF THE DISCLOSURE

Various disclosed embodiments relate to systems and methods for reducing energy consumption by industrial robots using motion path programming.

Various embodiments include systems, methods, and mediums for identifying a motion path for an industrial robot. According to one embodiment, a method includes identifying a plurality of points at which at least one component of the industrial robot is positioned during performance of a task. The identified points include at least a starting point and an ending point of the component for performing the task. The method also includes identifying a plurality of motion paths for the industrial robot to perform the task based on the identified points. The method further includes the taxonomy, selection, and calculation of energetically optimized motion paths and in a second step identifying energy consumption by the industrial robot for one or more of the identified motion paths. The method also includes selecting the motion path for the industrial robot based on the identified energy consumption. Additionally, the method includes storing information about the energy consumption by the industrial robot for the selected motion path.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure and the advantages thereof, reference is now made to the following descriptions taken in conjunction with the accompanying drawings, wherein like numbers designate like objects, and in which.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged device. The numerous innovative teachings of the present application will be described with reference to exemplary non-limiting embodiments.

Disclosed embodiments recognize that off-line programming of robots (OLP) has traditionally been focused on the creation of collision free motion paths with a focus on speed and minimal time consumption in task performance. The amount of energy consumed by the industrial robot was not considered.

Disclosed embodiments, described herein, provide improvements to the planning and programming of the motion path of an industrial robot that use less energy in performance of the task. In various embodiments, the present disclosure generates simulations to select optimal paths for task performance that reduce energy consumption while meeting timing requirements associated with the task performance.

Figure 1:
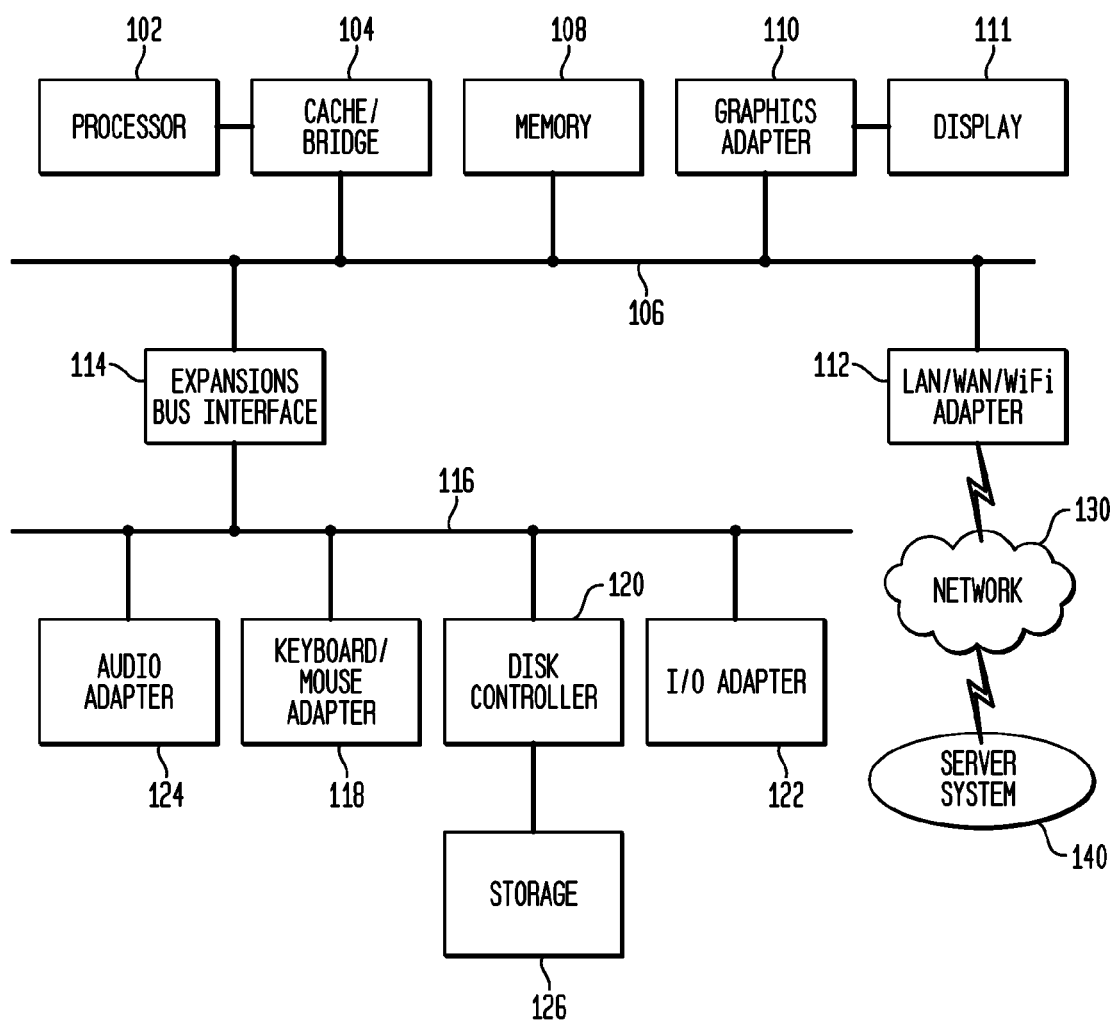
FIG. 1 illustrates a block diagram of a data processing system in which an embodiment can be implemented.

FIG. 1 illustrates a block diagram of a data processing system 100 in which an embodiment can be implemented, for example, as a PLM system or an OLP system particularly configured by software or otherwise to perform the processes as described herein, and, in particular, as each one of a plurality of interconnected and communicating systems as described herein. The data processing system 100 illustrated includes a processor 102 connected to a level two cache/bridge 104, which is connected in turn to a local system bus 106. Local system bus 106 may be, for example, a peripheral component interconnect (PCI) architecture bus. Also connected to local system bus 106 in the illustrated example are a main memory 108 and a graphics adapter 110. The graphics adapter 110 may be connected to display 111.

Other peripherals, such as local area network (LAN)/wide area network (WAN)/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums, such as read only memories (ROMs) or erasable, electrically programmable read only memories (EEPROMs), magnetic tape storage, and user-recordable type mediums, such as floppy disks, hard disk drives, and compact disk read only memories (CD-ROMs) or digital versatile disks (DVDs) and other known optical, electrical, or magnetic storage devices.

Also connected to I/O bus 116 in the example illustrated is audio adapter 124, to which speakers (not illustrated) may be connected for playing sounds. Keyboard/mouse adapter 118 provides a connection for a pointing device (not illustrated), such as a mouse, trackball, trackpointer, etc.

Those of ordinary skill in the art will appreciate that the hardware illustrated in FIG. 1 may vary for particular implementations. For example, other peripheral devices, such as an optical disk drive and the like, also may be used in addition to or in place of the hardware illustrated. The illustrated example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, may be generated to actuate a desired response.

One of various commercial operating systems, such as a version of Microsoft Windows™, a product of Microsoft Corporation located in Redmond, Wash., may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Figure 2:
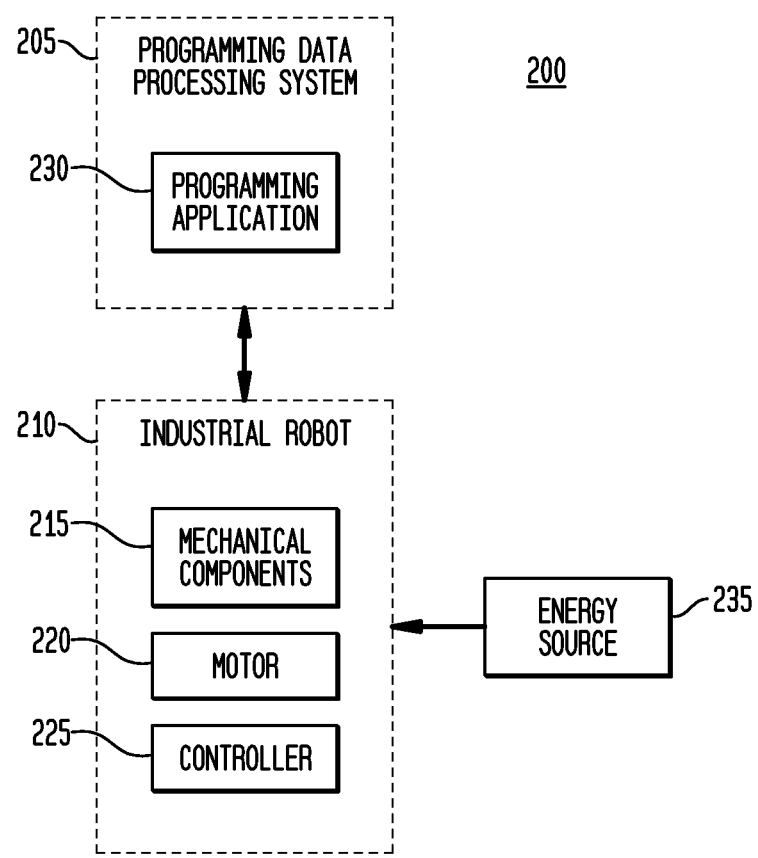
FIG. 2 illustrates a block diagram of a motion path programming system in which various embodiments of the present disclosure may be implemented.

FIG. 2 illustrates a block diagram of a motion path programming system 200 in which various embodiments of the present disclosure may be implemented. In this illustrative embodiment, the motion path programming system 200 includes a programming data processing system 205 that programs motion paths for an industrial robot 210. For example, the programming data processing system 205 is an example of one embodiment of the data processing system 100 in FIG. 1.

The industrial robot 210 includes, at a high level, mechanical components 215, at least one motor 220, and at least one controller 225. The mechanical components 215 are the movable portions of the industrial robot 210 that are used to perform a task. The mechanical components 215 may include, for example and without limitation, movable, extendable, and/or rotatable components, such as a base, arms, and peripheral devices, such as an end effector or end-of-arm-tooling (EOT). The robot 210 includes at least one and preferably more than one motor 220. The motor 220 provides mechanical energy to one or more of the components 215 to perform functions in the overall performance of a task. The motor 220 may be, for example and without limitation, electrical, pneumatic, or combustion. The controller 225 controls the operation of the industrial robot 210. For example, the controller 225 may be programmed to control the motor 220 to move one or more of the components 215 along a programmed motion path in performing a task.

The programming data processing system 205 programs the robot 210 to perform a task in accordance with a specified motion path. For example, the programming data processing system 205 may program the controller 225 to control the motor 220 to move the mechanical components 215 at a specified speed and direction in accordance with a specified timing pattern to enable the robot 210 to perform the task. In this manner, each of the components 215 moves at various points along a specified motion path. For example, the programming data processing system 205 may program the robot 210 to perform a task by starting at a starting point, controlling grippers to lift an object, moving the object to a specified point, releasing and placing the object at the specified point, and stopping at an ending point. Each of these points the robot 210 moves to are points along the motion path. The programming data processing system 205 includes a programming application 230 that allows a programmer to program the robot 210. The Tecnomatix Process Simulate programming application is an example of one type of programming application that is commercially available from Siemens Product Lifecycle Management Software Inc.

In various embodiments of the present disclosure, the programming data processing system 205 programs the motion path of the robot 210 with consideration for energy efficiency and optimization. For example, programming data processing system 205 may factor the movement capabilities of the robot 210, the time constraints of the task, and the geometric constraints of the working environment to identify a motion path where the robot 210 uses as little energy as possible to perform the task while meeting any timing constraints for the task and avoiding collision with any obstacles that may exist in the environment. The programming application 230 may include information about and/or provide a graphical representation of the robot 210 that includes the robot's 210 capabilities and constraints, such as, for example and without limitation, extension of extendable components, rotation of rotatable components, motor output power, and the distance, directions, and speed with which the various components 215 can be moved including movement of and/or re-positioning of the robot 210 itself, for example, via a movable pedestal of the robot 210. For example, this information may be identified from product specifications or programmed into the programming application 230. The programming application 230 may include information about and/or provide a graphical representation of the environment that the robot 210 is to perform the task, which may include locations and sizes of obstacles the robot 210 needs to avoid and/or objects the robot 210 is to interact with while performing the task. The programming application 230 may also include information about the task the robot 210 is to perform, such as, for example, a starting point, an ending point, and one or more functions to be performed along the way.

Using this information, the programming data processing system 205 determines a motion path for the robot to perform the task. For example, the programming data processing system 205 may divide the movements of robot 210 to perform the task into segments that are categorized into movement categories. For example, the categories may include directional acceleration, cornering movement, lifting, lowering, etc. For each of the categories, the programming data processing system 205 may apply various optimization algorithms based on the physics and kinetics of the robot 210 to determine an optimal path or paths from an energy perspective.

For example, if the task were for the robot 210 to lift an object over a fence, one motion path may be to lift the object straight up from the ground to the required height, move the object horizontally to the desired location, and lower the object to the ground. The programming data processing system 205 may identify one energetically optimized movement path as a parabolic path with acceleration at the start of the path, use of the kinetic energy of the moving object and the arm of the robot 210 to clear the fence, and then deceleration and lowering of the object to the desired location. In this example, the programming data processing system 205 may calculate an amount of energy used to perform the task based on the weight of the object and robot's 210 arm, the lifting height and movement distance. The programming data processing system 205 may calculate or estimate the energy consumption of each path to determine that the parabolic motion path is the more energy efficient path. The determination of the motion path may also be independent of the particular robot as the path selection is based on the application of physics and kinetics.

In various embodiments, the identification of the energy efficient motion path may be automatic. For example, the programming data processing system 205 may receive and/or identify information about the task, an existing motion path, the robot 210, and/or the environment where the robot 210 is located. Based on these inputs, the programming data processing system 205 performs optimization and outputs an energy efficient motion path, which is programmed into the robot 210. In another example, the programming data processing system 205 may automatically optimize an existing motion path for a robot. For example, the robot 210 may be initially programmed to perform a task using a specified motion path. The programming data processing system 205 may identify the different segments of the existing path and energetically optimize these sections with optimization algorithms that fit to the situation. The programming data processing system 205 may also optimize the connection points of the sections of the path the kinetic energy is handed over to the next section. After the optimization of the sections of the motion path, the programming data processing system 205 reconnects the sections to form an energetically optimized motion path for the task. The programming data processing system 205 may analytically calculate energy savings between the two paths for display to a programmer or operator. The amount of energy savings may be influenced by a dynamic and/or time factor. For example, a slow movement may use more energy than a dynamically optimized faster movement.

In other embodiments, the identification of the energy efficient motion path may be interactive. For example, the programming data processing system 205 may generate a simulation of one or more motion paths that may be used and receive inputs or selections from an operator or programmer as to which path segments and/or complete motion path to use. The programming data processing system 205 may dynamically calculate and display energy consumption values and/or task timing information to guide and/or assist the operator or programmer in creating and/or modifying the resultant motion path.

In various embodiments, the programming data processing system 205 calculates or estimates the amount of energy consumed by the industrial robot 210 using functions or algorithms for energy usage. For example, as discussed above, the programming data processing system 205 may know properties of the industrial robot 210 (e.g., extension length of extendable components, rotation axis (or axes) of rotatable components, motor output power, and/or the mass of the components 215), and properties of the task (e.g., the motion path and/or the mass of objects to be moved as part of the task) and use values for these known properties using mechanical equations or algorithms to determine energy usage. As non-limiting examples, the mechanical equations or algorithms that may be used in calculating energy include functions for kinetic energy (i.e., $K=\frac{1}{2} mass*velocity^2$) or work energy (W=force*distance).

In some embodiments, the programming data processing system 205 may identify the energy consumption from actual simulation, testing, and/or use of the robot 210. For example, the robot 210 and/or the programming data processing system 205 may measure the actual amount of energy received from the energy source 235 during testing or robot operation. As non-limiting examples, the measurement of the energy usage may be performed by an energy meter that is connected to or incorporated in the industrial robot 210. The measured energy consumption for optimized and non-optimized paths may be used for verification of energy savings and/or further optimization of the motion path.

In some embodiments, the robot 210, itself, may perform the identification of the motion path to be used to complete the task. For example, various components of the programming data processing system 205 may be implemented within the industrial robot 210. The robot 210 can store and/or identify the properties of the robot 210 and the information about performing the task to determine the appropriate motion path. The robot 210 may determine and/or modify the motion path use in advance of performing the task or while performing the task. For example, the robot 210 may perform "offline" or "online" programming of the motion path to determine and/or modify the motion path used. In some embodiments, the robot 210 may use dynamic information about the properties of the robot 210 and/or the information about performing the task to determine and/or modify the motion path during or before performance of the task. For example, the robot 210 may identify dynamic information, such as, chances in goals for performance of the task (e.g., changes energy efficiency vs. time efficiency goals), movement of obstacles or similar nearby self-optimizing robots present in the environment, changes in objects (e.g., weight, shape, or orientation) lifted by the robot, or properties of the robot, (e.g., tools attached, battery, power remaining, malfunctioning components, etc.). In some embodiments, the robot 210 may identify such information from sensors (e.g., cameras, motion sensors, weight sensors, radar, etc.) that are positioned on or nearby the robot 210.

The illustration of the motion path programming system 200 in FIG. 2 is not intended to imply any physical or architectural limitations in the various embodiments that may be implemented in accordance with the principals of the present disclosure. For example, the industrial robot 210 may include any number of different components 215, motor 220, and controllers 225. One motor 220 may be connected to and move one or more of the components along a motion path. Multiple motors 220 may work in combination to move along the motion path. Each motor 220 and/or component 215 may be controlled by a separate controller 225, a hierarchy of controllers 225, and/or one controller that controls overall operation of the robot 210.

Figure 3:
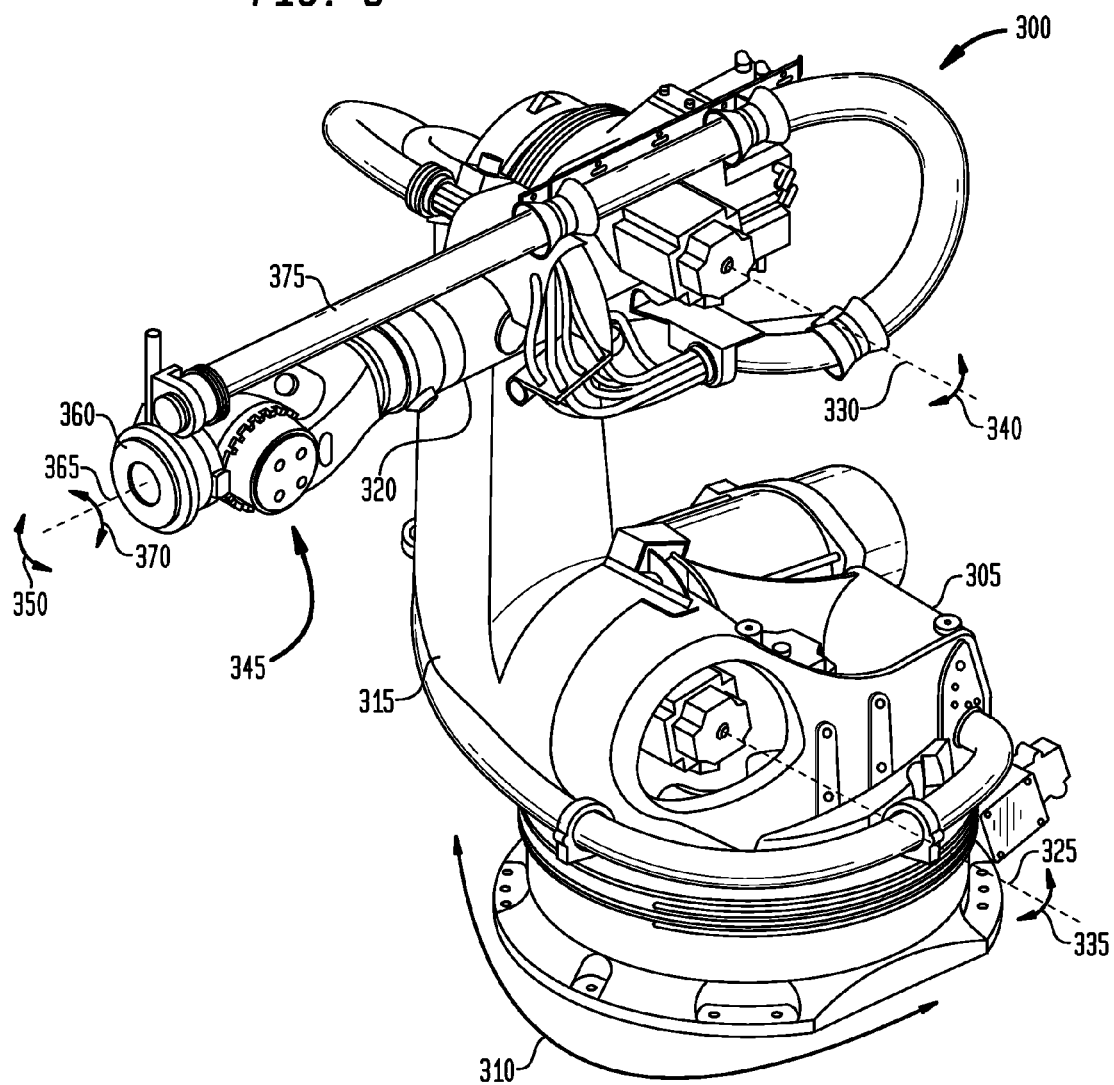
FIG. 3 illustrates an example of an industrial robot in which various embodiments of the present disclosure may be implemented.

FIG. 3 illustrates one example of an industrial robot 300 in which various embodiments of the present disclosure may be implemented. In this illustrative example, the robot 300 is one example of an embodiment of the industrial robot 210 in FIG. 2. For example, the robot 300 may be programmed by the programming data processing system 205 to perform a task in an energy efficient manner. As illustrated, the robot 300 includes a rotatable base 305 that is rotatable about an axis as indicated by the arrows 310. The robot 300 also includes lower arm 315 and upper arm 320 that are rotatable about axes 325 and 330, respectively, as indicated by arrows 335 and 340, respectively.

As illustrated, the robot 300 includes an end-of-arm section 345 that is movable up and down as indicated by arrows 350. The end-of-arm section 345 includes a surface 360 providing connection to a peripheral device, such as an end effector or EOT. The surface 360 is rotatable about an axis 365 as indicated by arrows 370. Examples of end effectors include welding devices, spray guns, grinding devices, a vacuum, and grippers (e.g., devices that can grasp an object using, for example, electromechanically or pneumatically supplied force). The robot 300 also includes tubing 375 that can provide, for example and without limitation, power, suction, compressed air, and/or fluids to the end-of-arm tool. FIG. 3 is intended as one example of an industrial robot in which embodiments of the present disclosure may be implemented. Embodiments of the present disclosure may be implemented in any type of industrial robot.

Figure 4:
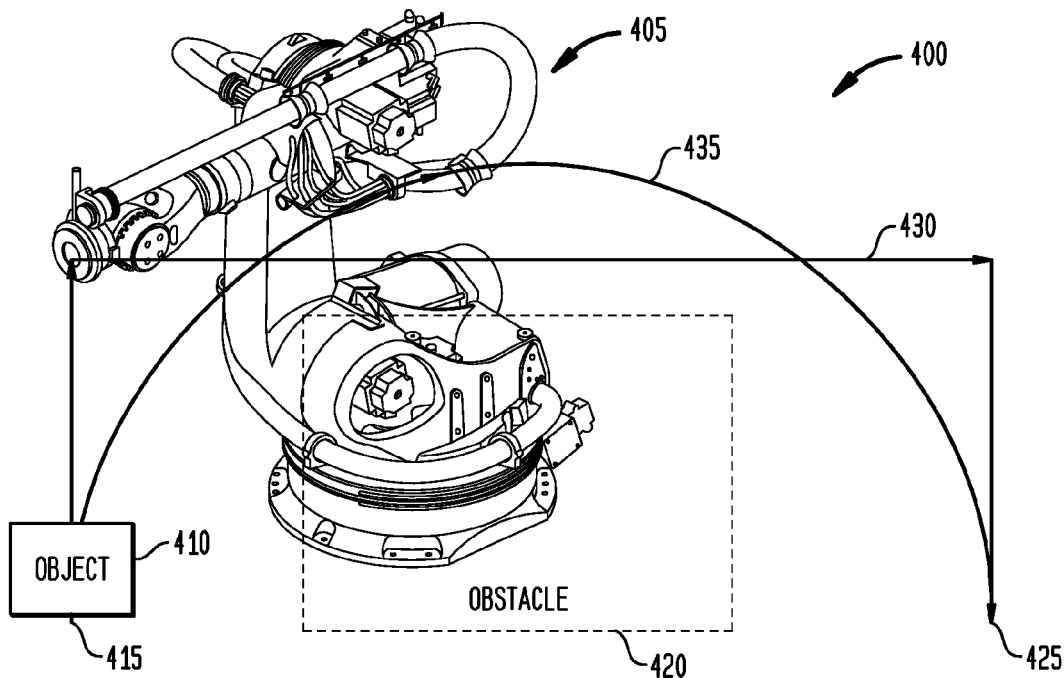
FIG. 4 illustrates an example of motion path planning in an environment where an industrial robot is located in accordance with an illustrative embodiment of the present disclosure.

FIG. 4 illustrates an example of motion path planning in an environment 400 where an industrial robot 405 is located in accordance with an illustrative embodiment of the present disclosure. In this illustrative example, the robot 405 is one example of an embodiment of the industrial robot 210 in FIG. 2. For example, the robot 405 may be programmed by the programming data processing system 205 to perform a task in an energy efficient manner.

In this illustrative embodiment, the robot 405 performs a task of moving an object 410 from a starting point 415 over an obstacle 420 to an ending point 425. FIG. 4 illustrates two possible motion paths that the robot 405 may take to perform this task. As illustrated by motion path 430, the robot 405 picks up the object 410 with a gripper, lifts the object 410 vertically to a height above the obstacle 420, moves the object 410 horizontally to the destination location, and lowers the object 410 down to the ending point 425. To optimize this path for energy efficiency, the programming data processing system 205 may divide this motion path into segments that are then categorized (e.g., lifting, cornering, lateral movement, cornering, and lowering) with a focus on the overall goal of the motion path. After iterations of algorithms, the programming data processing system 205 identifies the motion path 435 as a motion path that meets the geometric and timing constraints while reducing the energy consumption of the robot 405 to perform the task. For example, the programming data processing system 205 may identify the proper amount of acceleration and lifting angle based on the object weight and the output power of the robot 405 to lift the object 410 a threshold clearance over the obstacle 420 and clear the obstacle 420 en route to the ending point 425. Too much acceleration may waste energy, and too little acceleration may cause a collision.

FIG. 4 is intended as one example of a motion path that may be improved in accordance with the present disclosure. Embodiments of the present disclosure may analyze and optimize any other type of motion path of any level of complexity.

Figure 5:
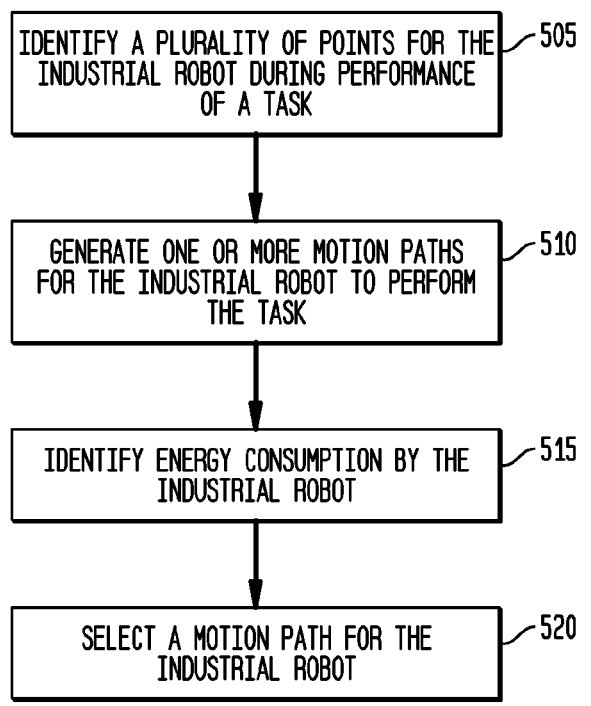
FIG. 5 illustrates a flowchart of a process for identifying a motion path for an industrial robot in accordance with disclosed embodiments.

FIG. 5 illustrates a flowchart of a process for identifying a motion path for an industrial robot in accordance with disclosed embodiments. This process can be performed, for example, by one or more PLM data processing systems and/or one or more OLP data processing systems configured to perform acts described below, referred to in the singular as "the system." The process can be implemented by executable instructions stored in a non-transitory computer-readable medium that cause one or more PLM data processing systems to perform such a process. The process illustrated in FIG. 5 is an example of a process that may be performed by the programming data processing system 205 in FIG. 2.

The process begins by the system identifying a plurality of points for the industrial robot during performance of a task (step 505). For example, as part of this step, the system may identify at least a starting point and an ending point of the component for performing the task. The system may also identify a point that the robot will need to clear in performing the task.

The system generates one or more motion paths for the industrial robot to perform the task (step 510). For example, as part of this step, the system may identify segments between the various points for the performance of the task and categorize the segments based on movement. The system may then apply optimization algorithms based on the type of movement to generate a resultant path. In another example, the system may generate a simulation of performance of the task by the industrial robot based on the starting point, the ending point, the parameters of the industrial robot, and/or information about the task performed by the industrial robot. The system may then generate the one or more motion paths to allow the industrial robot to meet the timing requirement for performance of the task and avoid collisions with obstacles in the environment.

The system identifies energy consumption by the industrial robot (step 515). For example, as part of this step, the system may estimate, predict, or calculate the energy consumption or energy savings compared with a previous motion path. The system may display the energy consumption or savings to an operator or programmer. The system may also store information about the energy consumption by the industrial robot for the motion path(s) generated.

The system selects a motion path for the industrial robot (step 520). For example, as part of this step, the system may automatically select the motion path as an energy efficient path. The system may iteratively optimize or improve the path to arrive an optimal or improved motion path. In another example, the system may receive a selection of the motion path from a user. In another example, the system may select the motion path based on timing consideration, for example, a motion path that minimizes or reduces an amount of time to complete one or more tasks performed by the robot. In yet another example, the system may select the motion path based on a combination of timing and energy consumption factors. For example, the system may select a motion path that meets timing constraints and reduces energy or may select a motion path that meets energy consumption goals with a minimal or reduced amount of time to complete the task.

Disclosed embodiments provide the ability to apply physics and kinematics to reduce energy consumption of industrial robots. Disclosed embodiments plan and program the motion path of an industrial robot that use less energy in performance of a task. Disclosed embodiments generate simulations to select optimal paths for task performance that reduce energy consumption while meeting timing constraints and geometrical constraints associated with the task performance.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being illustrated or described herein. Instead, only so much of a data processing system as is unique to the present disclosure or necessary for an understanding of the present disclosure is illustrated and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal-bearing medium or storage medium utilized to actually carry out the distribution. Examples of machine usable/readable or computer usable/readable mediums include: nonvolatile, hard-coded type mediums, such as read only memories (ROMs) or erasable, electrically programmable read only memories (EEPROMs), and user-recordable type mediums, such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for identifying a motion path for an industrial robot using a data processing system, the method comprising:
    identifying a plurality of points at which at least one component of the industrial robot is positioned during performance of a task, the identified points including at least a starting point and an ending point of the component for performing the task;
    generating, by the data processing system, one or more motion paths for the industrial robot to perform the task based on the identified points;
    identifying energy consumption by the industrial robot for the one or more generated motion paths;
    selecting the motion path for the industrial robot based on the identified energy consumption;
    separating the selected motion path into a plurality of segments;
    analyzing each path segment for energy saving based on a movement of at least one component of the industrial robot, a position of at least one component of the industrial robot, and a size of at least one component of the industrial robot to form analysis results;
    modifying one or more of the path segments based on the analysis results; and
    storing information about the energy consumption and the analysis results by the industrial robot for the selected motion path.

2. The method of claim 1 further comprising:
    identifying parameters of the industrial robot including an output power of at least one motor of the industrial robot, a rotation axis for at least one rotatable component of the industrial robot, a length of at least one extendable component of the industrial robot, and a coordinate acceleration of the at least one extendable component based on the output power and the rotation axis,
    wherein generating the one or more motion paths comprises:
        generating at least one simulation of performance of the task by the industrial robot based on the starting point, the ending point, and the parameters of the industrial robot; and generating the one or more motion paths by changing a velocity or acceleration of a component of the industrial robot during at least one segment of one or more of the one or more motion paths.

3. The method of claim 2 further comprising:
identifying information about the task performed by the industrial robot, the information about the task including the starting point, the ending point, a tool on the industrial robot used to perform the task, a weight of an object moved by the industrial robot during performance of the task, and a position of at least one obstacle in an environment where the industrial robot is located;
wherein generating the at least one simulation of performance of the task comprises generating the at least one simulation of performance of the task based on the information about the task performed by the industrial robot.

4. The method of claim 1 further comprising:
identifying a timing requirement for performance of the task by the industrial robot,
wherein generating the one or more motion paths comprises generating the one or more motion paths to allow the industrial robot to meet the timing requirement for performance of the task.

5. The method of claim 1 further comprising:
identifying information about an environment where the industrial robot is located, the information about the environment including information about a position of at least one obstacle,
wherein generating the one or more motion paths comprises generating the one or more motion paths to that avoid collision with the at least one obstacle.

6. The method of claim 1, wherein the motion path for the industrial robot is selected based on a reduction in energy consumption by the industrial robot during performance of the task or a reduction in an amount of time for the industrial robot to perform the task.

7. A data processing system for identifying a motion path for an industrial robot, the data processing system comprising:
at least one processor; and
a memory connected to the processor, the data processing system particularly configured to:
identify a plurality of points at which at least one component of the industrial robot is positioned during performance of a task, the identified points including at least a starting point and an ending point of the component for performing the task;
generate one or more motion paths for the industrial robot to perform the task based on the identified points;
identify energy consumption by the industrial robot for the one or more generated motion paths;
select the motion path for the industrial robot based on the identified energy consumption;
separate the selected motion path into a plurality of segments;
analyze each path segment for energy saving based on a movement of at least one component of the industrial robot, a position of at least one component of the industrial robot, and a size of at least one component of the industrial robot to form analysis results;
modify one or more of the path segments based on the analysis results; and
store information about the energy consumption and the analysis results by the industrial robot for the selected motion path.

8. The data processing system of claim 7, wherein the data processing system is further configured to:
identify parameters of the industrial robot including an output power of at least one motor of the industrial robot, a rotation axis for at least one rotatable component of the industrial robot, a length of at least one extendable component of the industrial robot, and a coordinate acceleration of the at least one extendable component based on the output power and the rotation axis,
wherein in generating the one or more motion paths, the data processing system is configured to generate at least one simulation of performance of the task by the industrial robot based on the starting point, the ending point, and the parameters of the industrial robot; and to generate the one or more motion paths by changing a velocity or acceleration of a component of the industrial robot during at least one segment of one or more of the one or more motion paths.

9. The data processing system of claim 8, wherein the data processing system is further configured to:
identify information about the task performed by the industrial robot, the information about the task including the starting point, the ending point, a tool on the industrial robot used to perform the task, a weight of an object moved by the industrial robot during performance of the task, and a position of at least one obstacle in an environment where the industrial robot is located;
wherein in generating the at least one simulation of performance of the task, the data processing system is configured to generate the at least one simulation of performance of the task based on the information about the task performed by the industrial robot.

10. The data processing system of claim 7, wherein the data processing system is further configured to:
identify a timing requirement for performance of the task by the industrial robot,
wherein in generating the one or more motion paths, the data processing system is configured to generate the one or more motion paths to allow the industrial robot to meet the timing requirement for performance of the task.

11. The data processing system of claim 7, wherein the data processing system is further configured to:
identify information about an environment where the industrial robot is located, the information about the environment including information about a position of at least one obstacle,
wherein in generating the one or more motion paths, the data processing system is configured to generate the one or more motion paths to avoid collision with the at least one obstacle.

12. The data processing system of claim 7, wherein the motion path for the industrial robot is selected based on a reduction in energy consumption by the industrial robot during performance of the task or a reduction in an amount of time for the industrial robot to perform the task.

13. A non-transitory computer-readable medium encoded with executable instructions for identifying a motion path for an industrial robot that, when executed, cause at least one data processing system to:
identify a plurality of points at which at least one component of the industrial robot is positioned during performance of a task, the identified points including at least a starting point and an ending point of the component for performing the task;

generate one or more motion paths for the industrial robot to perform the task based on the identified points;

identify energy consumption by the industrial robot for the one or more generated motion paths;

select the motion path for the industrial robot based on the identified energy consumption separate the selected motion path into a plurality of segments;

analyze each path segment for energy saving based on a movement of at least one component of the industrial robot, a position of at least one component of the industrial robot, and a size of at least one component of the industrial robot to form analysis results;

modify one or more of the path segments based on the analysis results; and store information about the energy consumption and the analysis results by the industrial robot for the selected motion path.

14. The computer-readable medium of claim 13 further comprising instructions that cause the data processing system to:

identify parameters of the industrial robot including an output power of at least one motor of the industrial robot, a rotation axis for at least one rotatable component of the industrial robot, a length of at least one extendable component of the industrial robot, and a coordinate acceleration of the at least one extendable component based on the output power and the rotation axis, wherein the instructions that cause the data processing system to generate the one or more motion paths comprise instructions that cause the data processing system to generate at least one simulation of performance of the task by the industrial robot based on the starting point, the ending point, and the parameters of the industrial robot; and to generate the one or more motion paths by changing a velocity or acceleration of a component of the industrial robot during at least one segment of one or more of the one or more motion paths.

15. The computer-readable medium of claim 14 further comprising instructions that cause the data processing system to:

identify information about the task performed by the industrial robot, the information about the task including the starting point, the ending point, a tool on the industrial robot used to perform the task, a weight of an object moved by the industrial robot during performance of the task, and a position of at least one obstacle in an environment where the industrial robot is located;

wherein the instructions that cause the data processing system to generate the at least one simulation of performance of the task comprise instructions that cause the data processing system to generate the at least one simulation of performance of the task based on the information about the task performed by the industrial robot.

16. The computer-readable medium of claim 13 further comprising instructions that cause the data processing system to:

identify a timing requirement for performance of the task by the industrial robot, wherein the instructions that cause the data processing system to generate the one or more motion paths comprise instructions that cause the data processing system to generate the one or more motion paths to allow the industrial robot to meet the timing requirement for performance of the task.

17. The computer-readable medium of claim 13 further comprising instructions that cause the data processing system to:

identify information about an environment where the industrial robot is located, the information about the environment including information about a position of at least one obstacle, wherein the instructions that cause the data processing system to generate the one or more motion paths comprise instructions that cause the data processing system to generate the one or more motion paths to avoid collision with the at least one obstacle.

18. The computer-readable medium of claim 13, wherein the motion path for the industrial robot is selected based on a reduction in energy consumption by the industrial robot during performance of the task or a reduction in an amount of time for the industrial robot to perform the task.

* * * * *